United States Patent [19]  
Furukawa et al.

[11] Patent Number: 4,553,768  
[45] Date of Patent: Nov. 19, 1985

[54] REAR SUSPENSION FOR VEHICLES

[75] Inventors: Yoshimi Furukawa, Saitama; Shoichi Sano, Tokyo; Hiroshi Takamatsu, Saitama; Makoto Sato, Saitama, all of Japan

[73] Assignee: Honda Giken Kogyo Kabushiki Kaisha, Tokyo, Japan

[21] Appl. No.: 553,704

[22] Filed: Nov. 21, 1983

[30] Foreign Application Priority Data

Nov. 19, 1982 [JP] Japan .................................. 57-204296  
Dec. 8, 1982 [JP] Japan .................................. 57-214817

[51] Int. Cl.⁴ .............................................. B62D 7/00  
[52] U.S. Cl. ............................................ 280/91; 280/94  
[58] Field of Search .................... 280/91, 94, 668, 696, 280/701

[56] References Cited

U.S. PATENT DOCUMENTS 2,862,722 12/1958 Brueder .................................. 280/94  
3,352,515 11/1967 Albright ................................. 280/94  
3,426,612 2/1969 Henry-Biabaud ..................... 280/94  
3,727,940 4/1973 Hug ........................................ 280/668  
4,406,472 9/1983 Furukawa ............................. 280/91

FOREIGN PATENT DOCUMENTS 119511 9/1980 Japan ................................. 280/668

Primary Examiner—Joseph F. Peters, Jr.  
Assistant Examiner—Ross Weaver  
Attorney, Agent, or Firm—Irving M. Weiner; Joseph P. Carrier; John J. Cantarella

[57] ABSTRACT

A rear suspension for a vehicle including a vehicle body, front and rear wheels and a steering system for steering both the front and rear wheels by a steering wheel.

The rear suspension comprises a rear sheel support member for supporting the rear wheels with respect to the vehicle body and a biasing mechanism, interposed between the vehicle body and the rear wheel support member, for biasing the rear wheel to restore the steering position thereof to the neutral position thereof.

The rear wheel support member may comprise a shock absorber and a lower arm while the biasing mechanism may be a rubber bush.

7 Claims, 10 Drawing Figures

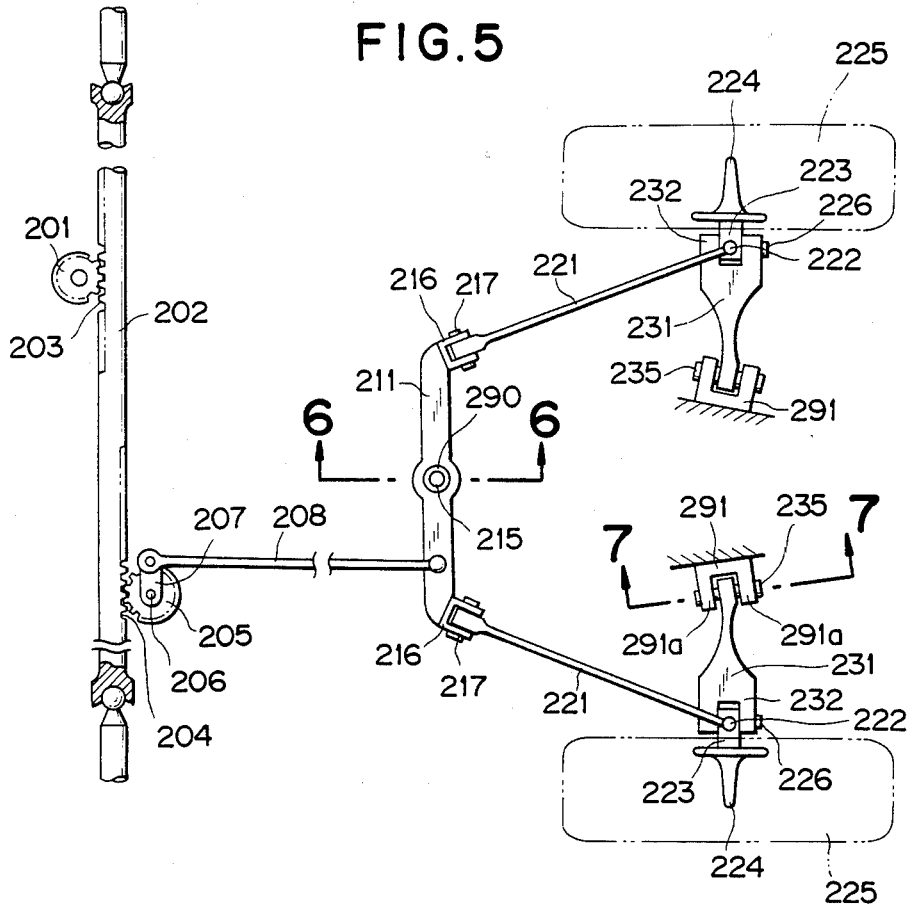
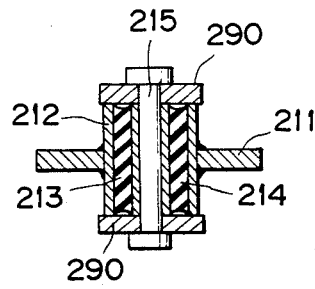
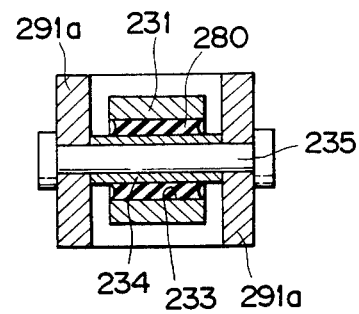

REAR SUSPENSION FOR VEHICLES

BACKGROUND OF THE INVENTION

1. Field of the Invention

The present invention generally relates to a rear suspension for vehicles. More particularly, the invention relates to a rear suspension for a vehicle including front and rear wheels and a steering system for steering both the front and rear wheels by means of a steering wheel.

2. Description of Relevant Art

The present applicant has proposed steering systems for vehicles, such as in Japanese Patent Lay-Open Print Nos. 58-20564 and 58-164478, in which, from a front steering sub-system for steering front wheels, the necessary rotation for steering rear wheels is output through a linkage member in the form of an angular displacement such as of a pivotable link or an off-centered pin, to thereby steer the rear wheels as well as the front wheels while changing the steered angle ratio of the rear wheels to the front wheels in proportion to the steering angle of a steering wheel.

With such a steering system, for a vehicle having front and rear wheels, the rear wheels are able to be steered in the same direction as the front wheels for relatively small steering angles of a steering wheel and in the opposite direction thereto for relatively large steering angles thereof. Accordingly, there is provided favorable vehicle maneuverability when travelling at relatively high speeds, as well as favorable vehicle turning characteristics due to relatively small turning radii for handling large steering angles such as in a U-turn or when steering in and out of a parking space.

The present invention has been achieved in consideration of the situation a vehicle with such a steering system may confront when a rear steering sub-system for steering rear wheels becomes inoperative.

SUMMARY OF THE INVENTION

According to the present invention, there is provided a rear suspension for a vehicle including a vehicle body, a front wheel, a rear wheel and a steering system for steering both the front and rear wheels by means of a steering wheel, comprising a rear wheel support member for supporting the rear wheel with respect to the vehicle body and a biasing mechanism, interposed between the vehicle body and the rear wheel support member, for biasing to restore the steering position of the rear wheel to the neutral position thereof.

Accordingly, an object of the present invention is to provide a rear suspension for a vehicle including front and rear wheels which are both steerable, and capable, when a rear steering sub-system for steering the rear wheels becomes inoperative, of restoring the rear wheels to the zero position of steered angle and holding same in position.

The above and further features, objects and advantages of the present invention will more fully appear from the following detailed description of the preferred embodiments of the invention when the same is read in conjunction with the accompanying drawings.

BRIEF DESCRIPTION OF THE DRAWINGS

FIG. 5 is a schematic plan view of a front and rear wheel steering system of a vehicle equipped with a rear suspension according to a third embodiment of the invention.

FIG. 6 is an enlarged sectional view taken along line "6"—"6" of FIG. 5.

FIG. 7 is an enlarged sectional view taken along line "7"—"7" of FIG. 5.

DETAILED DESCRIPTION OF THE PREFERRED EMBODIMENTS

Figure 1:
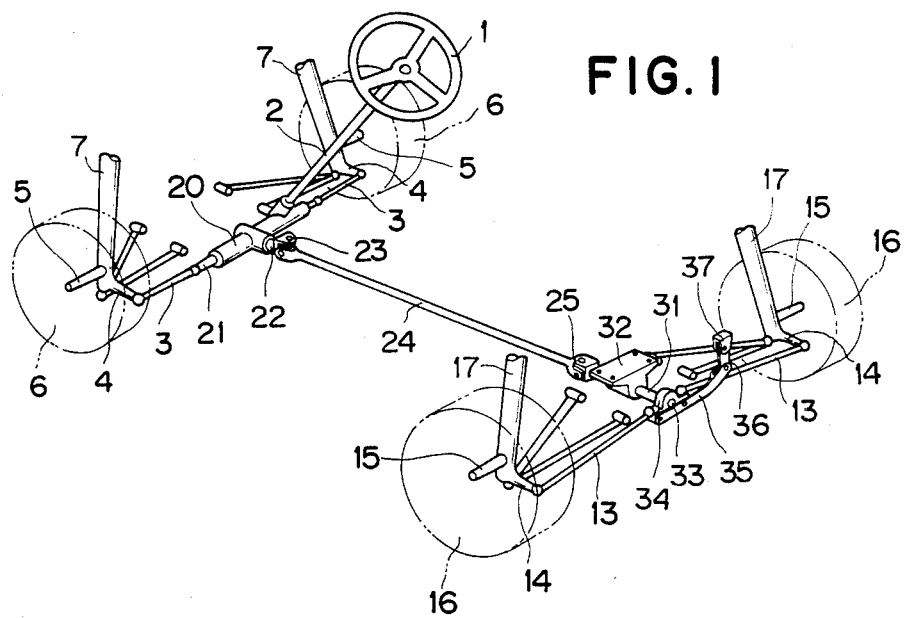
FIG. 1 is a schematic perspective view showing an example of a front and rear wheel steering system of a vehicle to which the present invention is applicable.

Referring first to FIG. 1, designated at reference numeral 1 is a steering wheel. The steering wheel 1 is provided with a steering shaft 2 assembled at the distal end thereof in a front wheel steering gearbox 20 of a rack and pinion type. As already known, such as from Japanese Patent Lay-Open Print No. 58-20564 (German Lay-Open Print No. 3228181), in the gearbox 20, the steering shaft 2 has at the distal end thereof a drive pinion (not shown) secured thereto and engaged with a rack (not shown) formed on the right-half part of a rack shaft 21. The rack shaft 21 is projected at either end thereof from both sides of the front steering gearbox 20 and connected to respective inner ends of a pair of tie rods 3, 3, each respectively connected at the outer end thereof to one of a pair of knuckle arms 4, 4 which have their axle shafts 5, 5 projecting outwardly and respectively supporting a pair of front wheels 6, 6.

The steering of the front wheels 6, 6 is effected by the transverse movement of the rack shaft 21 in a well known manner.

The rack shaft 21 is formed on the left-half part thereof with another rack (not shown) engaged with a driven pinion (not shown) which has a pinion shaft 22 projecting rearwardly from the gearbox 20. The pinion shaft 22 is connected at the rear end thereof through a universal joint 23 to the front end of a relatively long link shaft 24 which is in turn connected at the rear end thereof through a universal joint 25 to the front end of an input shaft 31 of a rear wheel steering mechanism. The input shaft 31 is a rotatable member suppported by a bearing bracket 32 and disposed in alignment with the longitudinal centerline of a vehicle body (not shown), and has an off-centered pin 33 integrally secured thereto through a crank arm (not shown). On the off-centered pin 33, there is loose-fitted a joint member 34 which interconnects the respective inner ends of left and right rear tie rods 13, 13, while the joint member 34 is suspended from the vehicle body by means of an arm 35, a link 36 and a bracket 37, thus being restricted in swinging motion about the off-centered pin 33. The tie rods 13, 13 are respectively connected at their outer ends to a pair of knuckle arms 14, 14 which have their axle shafts 15, 15 projecting outwardly and respectively supporting a pair of rear wheels 16, 16.

In the above described arrangement, when the steering wheel 1 is operated to be steered, the necessary rotation for steering the rear wheels 16, 16 will be output at the pinion shaft 22 and input through the link shaft 24, which thereby rotates, to the input shaft 31 of the rear wheel steering mechanism. In accordance with the rotation of the input shaft 31, the off-centered pin 33 integrally secured thereto and initially positioned immediately above or under the axis thereof will rotate in a crank manner together with the joint member 34, thereby turning the rear wheels 16, 16 through the tie rods 13, 13 and the knuckle arms 14, 14. As a result, the rear wheels 16, 16 will be steered in the same direction as the front wheels 6, 6 for relatively small steering angles of the steering wheel 1, corresponding to the range from the initial neutral position to one-half revolution of the off-centered pin 33, and in the opposite direction thereto for relatively large steering angles thereof corresponding to the range exceeding one-half revolution of the off-centered pin 33.

The front and rear knuckle arms 4, 4 and 14, 14 are respectively suspended from the vehicle body in a cushioned manner by front and rear shock absorbers 7, 7 and 17, 17, each respectively disposed therebetween and arranged so as to constitute a Mc'pherson strut system.

Figure 2:
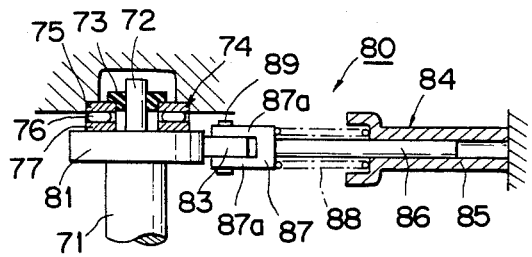
FIG. 2 is a side view, partly in section, of an essential part of a rear suspension according to a first embodiment of the invention.
Figure 3:
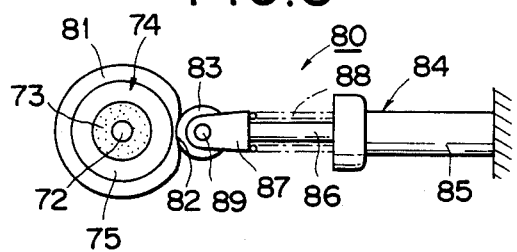
FIG. 3 is a plan view of the essential part of the rear suspension of FIG. 2.

Referring now to FIGS. 2 and 3 showing an essential part of a rear suspension according to the first embodiment of the invention as applied to the steering system of FIG. 1, generally designated at reference numeral 80 is one of a pair of steering position biasing mechanisms disposed respectively at the left and right of the vehicle body for biasing to restore the respective steering positions of the rear wheels 16, 16 to their neutral positions, i.e., the positions the rear wheels 16, 16 will respectively assume when the steering wheel 1 is returned to its neutral or center position. The steering position biasing mechanism 80 is interposed between the vehicle body and a piston rod 71 of one of the rear shock absorbers 17, 17, disposed on the corresponding side, and comprises a centering cam 81, a push roller 83 and a pusher 84, each arranged as described below.

The centering cam 81 is shaped in a disk-like form and secured to the upper end of the piston rod 71 projecting upwardly from the rear shock absorber 17, while the piston rod 71 is arranged to be integrally rotatable with the corresponding one of the rear knuckle arms 14, 14. Above the centering cam 81, there is integrally provided a shaft rod 72 extending upwardly therefrom, the shaft rod 72 having around the upper part thereof a rubber bush 73 which is fixed by baking at the central part thereof onto a circumferential portion of the shaft rod 72 and at the lower part thereof onto an upper race 75 of a thrust bearing 74. The thrust bearing 74 has a plurality of balls 76 between the upper race 75, which is further fixed to the vehicle body, and a lower race 77 fixedly attached to the upper face of the centering cam 81. With this arrangement, the piston rod 71 of the rear shock absorber 17 is rotatably supported by the vehicle body, while receiving the resistance due to the resiliency of the rubber bush 73, so that the rear knuckle arm 14 as well as the rear shock absorber 17 is arranged to be rotatable, thus permitting the corresponding rear wheel 16 to be turned in accordance with the operation of the steering wheel 1.

The push roller 83 is arranged to be kept in contact with the outer circumference of the centering cam 81 and engageable with an inwardly curved recess 82 formed in this outer circumference.

The pusher 84 includes a cylinder 85 arranged substantially horizontally and secured to a certain member constituting part of the vehicle body, the cylinder 85 having a push rod 86 projecting therefrom toward the push roller 83. The push rod 86 is provided with a channel-like roller holder 87 secured to the distal end thereof and a compressed coil spring 88 fitted thereon, the coil spring 88 being interposed between the cylinder 85 and the roller holder 87. The roller holder 87 has upper and lower holding parts 87a, 87a holding upright a pin 89 on which the push roller 83 is fitted.

The push roller 83 is thus normally pushed by the pusher 84 against the centering cam 81 which is initially set such that the push roller 83 becomes engaged with the central part of the curved recess 82 when the corresponding rear wheel 16 is in the neutral position.

When the rear wheel steering sub-system becomes free from the operation of the steering wheel 1 for some reason, at each transverse side of the vehicle, the rear wheel 16 will be restored to the neutral position due to the elastic force of the rubber bush 73 connecting the shock abshorber 17 to the vehicle body, and favorably centered to be held therein by the centering effect of the curved recess 82 of the centering cam 81 against which the push roller 83 is pushed by the pusher 84.

In the above arrangement, the configuration and size of the recess 82 of the centering cam 81 may be properly determined in accordance with the limits of turning angle of the rear wheel 16. Moreover, the push roller 83 as an engagement element and the pusher 84 as a pushing means may be of any other suitable constructions, respectively.

Figure 4:
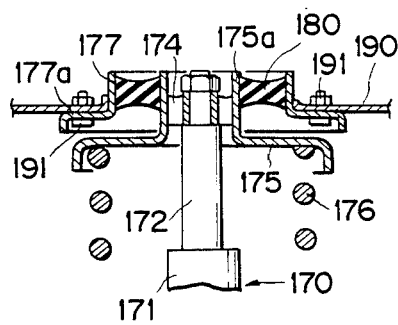
FIG. 4 is a longitudinal sectional view of an essential part of a rear suspension according to a second embodiment of the invention.

Referring now to FIG. 4, there will be described hereinbelow a rear suspension according to the second embodiment of the invention, which has an elastic return member interposed between a telescopic shock absorber and a vehicle body and is applicable to a vehicle having a steering system similar to that of FIG. 1.

In FIG. 4, generally designated at reference numeral 170 is a telescopic shock absorber integrally assembled with a knuckle arm (not shown) of a rear wheel (not shown). The shock absorber 170 comprises a cylinder 171, a piston rod 172 vertically slidably fitted in the cylinder 171 and arranged integrally rotatable therewith, the piston rod 172 projecting upwardly from the cylinder 171, a collar 174 fixedly fitted on the upper end of the piston rod 172, an upper spring seat 175 secured to the collar 174, a lower spring seat (not shown) secured to the cylinder 171, and a compressed coil spring 176 interposed between the upper spring seat 175 and the lower spring seat. The upper spring seat 175 has a tubular portion 175a fixedly fitted on the collar 174 and in turn fitted in a rubber bush 180 of strong resiliency. The rubber bush 180 is secured by baking along the inner circumferential portion thereof onto an outer circumferential portion of the tubular portion 175a and along the outer circumferential portion thereof onto an inner circumferential portion of a vertical tubular holder 177. The tubular holder 177 has in the lower part thereof a horizontally flanged portion 177a secured by a plurality of bolts 191 to a member 190, such as a tire housing, constituting a part of vehicle body, thereby attaching the shock absorber 170 to the vehicle body.

Accordingly, when a rear wheel steering sub-system becomes free from the operation of a steering wheel, the rear wheel will be returned to its neutral position due to the strong resiliency of the rubber bush 180 connecting the shock absorber 170 to the vehicle body.

Referring now to FIGS. 5 to 7, there will be described a rear suspension according to a third embodiment of the invention, as applied to a vehicle equipped with a front and rear wheel steering system different from that of FIG. 1.

In FIG. 5, designated at reference numeral 201 is a drive pinion coaxially secured to the lower end of a steering shaft (not shown). The drive pinion 201 is engaged with a rack 203 formed in the right-half part of a rack shaft 202 which has in the left-half part thereof another rack 204 engaged with a driven pinion 205. The racks 203, 204 are formed at the front and rear sides of the rack shaft 203, respectively.

The driven pinion 205 is coaxially secured to a pinion shaft 206 which is in turn integrally secured to one end of an off-setting arm 207. The other end of the offsetting arm 207 is pivotally connected to the front end of a push-pull link 208 extending substantially longitudinally of the vehicle, and the rear end of the push-pull link 208 is pivotably connected to the left-half part of a connecting arm 211 extending substantially transversely of the vehicle.

As shown in FIG. 6, the connecting arm 211 has at the center thereof a vertically arranged sleeve 212 provided therethrough and integrally secured thereto by welding, the sleeve 212 being provided with a rubber bush 213 fitted therein. The rubber bush 213 is secured by baking along the outer circumferential portion thereof onto the inner circumferential portion of the sleeve 212 and along the inner circumferential portion thereof onto the outer circumferential portion of a collar 214 fitted therein. The collar 214 is fixedly fitted on a vertical pin 215 which is secured at the upper and lower ends thereof to upper and lower bracket plates 290, 290, respectively, both fixed to a transversely central portion of a body of the vehicle. In this way, the sleeve 212 is rotatably supported by the bracket plates 290, 290, thus permitting the connecting arm 211 to turn about the pin 215 as a fixed shaft with respect to the vehicle body.

As shown in FIG. 5, the connecting arm 211 has at the left and right ends thereof either of a pair of channel-like brackets 216, 216 secured thereto and directed rearwardly while slanting transversely outwardly. The brackets 216, 216 are each respectively provided with one of a pair of pivot pins 217, 217 to which a pair of radius rods 221, 221 are respectively pivotally connected at the front ends thereof so as to be vertically swingable.

At the left and right of the vehicle body, the radius rods 221, 221 are each respectively operatively connected at the rear end thereof through a ball joint 222 onto the upper face of a transversely inward projection of a knuckle arm 223 which has an axle shaft 224 projecting outwardly for supporting a rear wheel 225. The inward projection of the knuckle arm 223 is loose-fitted in a forked outer end portion 232 of a lower control arm 231 of the so-called A type, and pivotably fitted on a horizontal pin 226 supported by the forked portion 232. The lower arm 231 is supported at the inner end thereof through another pin 235 by a bracket 291 in a manner described below. The bracket 291 is in the form of a channel opening transversely outwardly while somewhat slanting rearwardly, and secured to a certain component member of the vehicle body.

As shown in FIG. 7, the inner end of the lower arm 231 has a support hole 233 opened therethrough substantially in the longitudinal direction of the vehicle body. In the support hole 233, there is fitted a rubber bush 280 of strong resiliency and secured by baking along the outer circumferential portion thereof onto the inside wall of the support hole 233 and along the inner circumferential portion thereof onto the outer circumferential portion of a collar 234. The collar 234 is fixedly fitted on the intermediate part of the pin 235 which is secured at the front and rear ends thereof to front and rear outwardly flanged parts 291a, 291a of the bracket 291, respectively.

In the above arrangement, the offsetting arm 207 interconnecting the pinion shaft 206 and the push-pull link 208 has its initial or neutral position in the transverse direction of the vehicle body, i.e., it is initially directed to the left or right, and to the right in the example of FIG. 5.

When a steering wheel (not shown) is operated to be steered, the offsetting arm 207 will be turned correspondingly about the pinion shaft 206, thus longitudinally moving the push-pull link 208 and horizontally turning the connecting arm 211. As a result, the radius rods 221, 221 will move longitudinally, one forwardly and the other rearwardly, thus causing, at each transverse side of the vehicle, the knuckle arm 223 to pivot horizontally about the inner end of the lower arm 231, thereby turning to steer the rear wheel 225.

The above steering system may have a front wheel steering sub-system similar to that of FIG. 1. In such a case, for relatively small steering angles of the steering wheel corresponding to the range from the initial position to one-fourth revolution of the offsetting arm 207, the rear wheel 225 can be steered in the same direction as the front wheels (not shown) by considerably small angles changeable at very low rates.

In this embodiment, a connecting arm and left and right lower control arms are supported by a central rubber bush and left and right rubber bushes, respectively, all secured to a vehicle body, thus permitting the rear wheels to be properly and quickly returned to their neutral positions, thereby effectively raising the steering responsiveness of the vehicle when travelling at relatively high speeds.

Particularly, the left and right lower arms are pivotably supported at their inner ends by the left and right rubber bushes, respectively, which are of strong resiliency, so that the rear wheels will be successfully restored to and held in the neutral positions even when a rear wheel steering sub-system becomes free from the operation of a steering wheel for some reason.

Moreover, in the above embodiment, in which a push-pull link is pivotably connected to the connecting rod, the pivot point may be changed to any position so as to obtain a selective lever ratio.

In this respect, to obtain the same effect, the push-pull link may be directly connected to either one of the left and right lower arms or to one of a pair of radius rods interconnecting the connecting arm and the lower arms.

Figure 8:
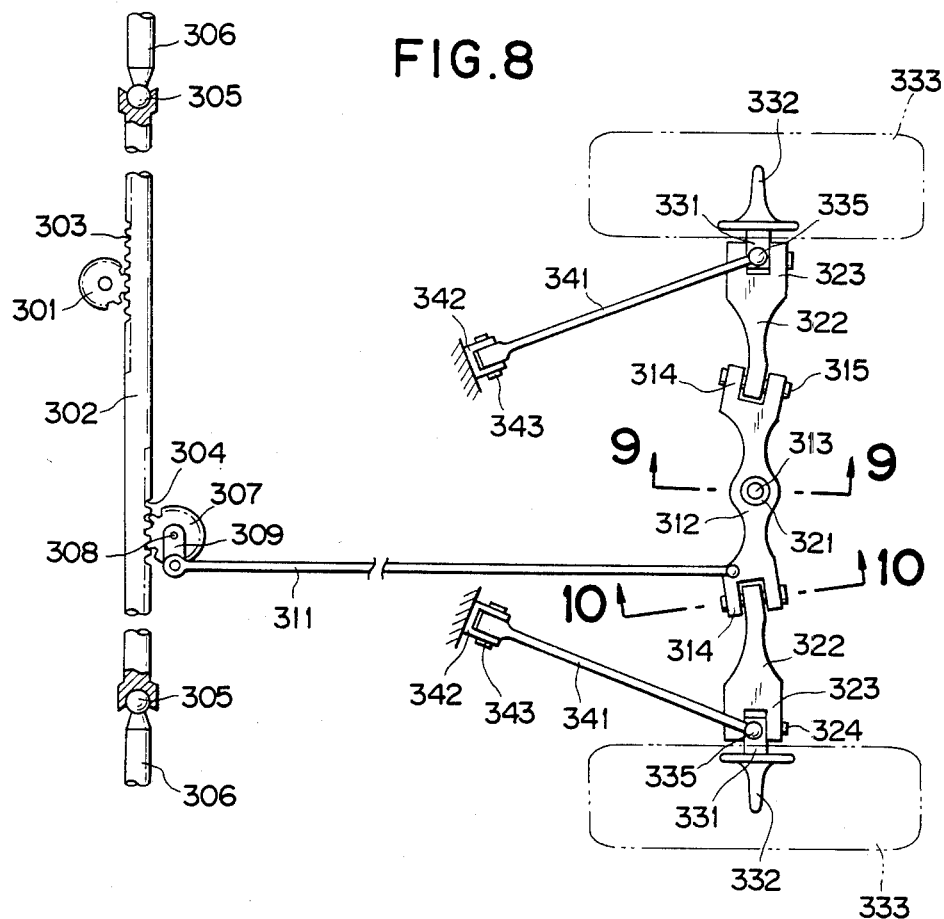
FIG. 8 is an explicative plan view showing a modified example of the steering system of FIG. 5.
Figure 9:
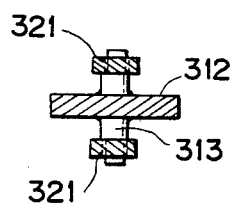
FIG. 9 is an enlarged sectional view taken along line "9"—"9" of FIG. 8.
Figure 10:
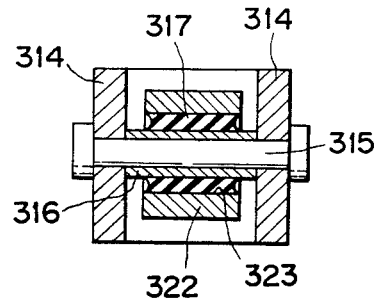
FIG. 10 is an enlarged sectional view taken along line "10"—"10" of FIG. 8.

Referring now to FIGS. 8 to 10, there will be described hereinbelow a rear suspension employed in a front and rear wheel steering system of a type modified from the example described in conjunction with the third embodiment of the invention.

As shown in FIG. 8, the modified steering system has a front wheel steering sub-system including a drive pinion 301, a rack 303 formed in the right-half part of a rack shaft 302, a pair of ball joints 305 respectively provided at both ends of the rack shaft 302 and a pair of front tie rods 306, all cooperatively functioning to steer left and right front wheels (not shown) in a manner similar to the example of FIG. 5. Moreover, for rear wheel steering, there are employed another rack 304 formed in the left-half part of the rack shaft 302, a driven pinion 307, an offsetting arm 309 and a push-pull link 311, all arranged in a similar manner to FIG. 5. The push-pull link 311 is pivotably connected at the rear end thereof to a connecting arm 312 which in its initial or neutral position extends in the transverse direction of a vehicle body.

As shown in FIG. 9, the connecting arm 312 has at the center thereof a vertical pin 313 provided therethrough and secured thereto by welding. The pin 313 is loose-fitted at the upper and lower ends thereof in upper and lower bracket plates 321, 321, respectively, while being kept from axial movement. The bracket plates 321, 321 are both secured to a transversely central portion of the vehicle body. Accordingly, the connecting arm 312 is supported by the vehicle body so as to be integrally rotatable with the pin 313 about the axis of the pin 313.

As shown in FIG. 8, the connecting arm 312 has at both ends thereof either of a pair of forked portions 314, 314, each respectively pivotably supporting the transversely inner end of one of a pair of lower control arms 322, 322 in the below described manner.

As shown in FIG. 10, each of the forked portions 314, 314 is provided with a pivot pin 315 secured thereto, the pivot pin 315 extending substantially longitudinally of the vehicle body. On the other hand, the inner end of the lower arm 322 has a through hole 323 formed therein and fitted on a rubber bush 317 of strong resiliency. The rubber bush 317 is secured by baking along the outer circumferential portion thereof onto the inside wall of the through hole 323 and along the inner circumferential portion thereof onto the outer circumferential portion of a collar 316. The collar 316 is fixedly fitted on the intermediate part of the pin 315.

At each transverse side of the vehicle body, the lower arm 322, which is of the so-called A type, has a forked outer end portion 323 pivotably supporting a transversely inward projection of a knuckle arm 331 by means of a pivot pin 324. On the upper face of the inward projection of the knuckle arm 331, there is integrally provided a ball joint 335 pivoting the rear end of a radius rod 341 which is in turn pivotably connected at the front end thereof through another pin 343 to a bracket 342 secured to the vehicle body. The knuckle arm 331 has an axle shaft 332 projecting outwardly therefrom and supporting a rear wheel 333 which is thus permitted by the ball joint 335 to turn transversely together with the knuckle arm 331.

In the above arrangement, the offsetting arm 309 interconnecting the pinion shaft 308 and the push-pull link 311 has its initial or neutral position extending in the transverse direction of the vehicle body, i.e., it is initially directed to the left or right, and to the left in the example of FIG. 8.

When a steering wheel (not shown) is operated to the right for example, the driven pinion 307 will be caused through the drive pinion 301 and the rack shaft 302 to rotate to the left together with the offsetting arm 309. Up to the first one-fourth revolution, the distal end of the offsetting arm 309 will turn rearwardly, thus rearwardly pushing the push-pull link 311, thereby counterclockwise turning the connecting arm 312 together with the pin 313 by a small angle about the axis of the pin 313. With the counterclockwise turning of the connecting arm 312, the left and right lower arms 322, 322 will turn rearwardly and forwardly, respectively, about the respective axes of the ball joints 335, 335 at which the left and right knuckle arms 331, 331 are pivotably supported by the left and right radius rods 341, 341, respectively. Concurrently, at each end of the connecting arm 312, the rubber bush 317 interposed between the pin 315 held in the forked portion 314 and the inner end of the lower arm 322 will be correspondingly compressed to be elastically deformed. As a result, the left and right knuckle arms 331, 331 will turn somewhat in the clockwise direction about the axes of the ball joints 335, 335, thus turning the left and right rear wheels 333, 333 by a small angle to the right, i.e., in the same direction as the front wheels, while the turning angle is rendered extremely small due to the interposition of the lower arms 322, 322.

When the steering wheel is turned to the neutral position, the above movements of the push-pull link 311 and the connecting arm 312 will be reversed and, at each transverse side of the vehicle body, the lower arm 322 will be quickly returned to its neutral position by the resiliency of the rubber bush 317 interposed between the lower arm 322 and the forked portion 314 of the connecting arm 312, thus quickly restoring the rear wheel 333 to the neutral position.

In the above steering system, similarly to the example of FIG. 5, for relatively small steering angles of the steering wheel, the rear wheels 333, 333 are to be steered in the same direction as the front wheels by extremely small angles and, moreover, caused to properly and quickly return to the neutral positions, thus effectively raising the steering responsiveness of the vehicle when travelling at relatively high speeds.

According to the above arrangement, the steered angle of the rear wheels 333, 333 in the opposite direction relative to the front wheels will also become very small, thus successfully avoiding the interference which might otherwise occur between a rear wheel and a tire housing.

Further, by changing the pivot point of the push-pull link 311 on the connecting arm 312 or by varying the length of the lower arms 322, 322, various lever ratios are obtainable.

In this respect, a similar effect may be obtained by connecting a push-pull link directly to either of left and right lower arms.

Furthermore, by increasing the resiliency of the rubber bush 317, the rear wheels 333, 333 can be quickly restored to and properly kept in the neutral positions when a rear wheel steering sub-system becomes free from the operation of the steering wheel.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative and not restrictive. The scope of the invention is indicated by the appended claims rather than by the foregoing description.

We claim:

1. A rear suspension for a vehicle including a vehicle body, a front wheel, a rear wheel and a steering system for steering both said front wheel and said rear wheel by a steering wheel, comprising:
- a rear wheel support member for supporting said rear wheel with respect to said vehicle body;
- biasing means, interposed between said vehicle body and said rear wheel support member, for biasing said rear wheel to restore the steering position thereof to the neutral position thereof;
- a knuckle arm supporting said rear wheel, and a lower arm turnable relative to said vehicle body integrally with said knuckle arm; and
- said biasing means comprising a resilient member interconnecting said vehicle body and a transversely inner end of said lower arm, said resilient member being of strong resiliency.

2. A rear suspension according to claim 1, wherein: said resilient member comprises a rubber bush.

3. A rear suspension according to claim 1, wherein: said steering system comprises a rack shaft for steering said front wheel, a driven pinion engaging with a rack on said rack shaft, an offsetting arm connected to said driven pinion so as to be integrally rotatable therewith, a push-pull link pivotably connected at one end thereof to one end of said offsetting arm, and a connecting arm for steering said rear wheel, said connecting arm being pivotably connected to the other end of said push-pull link.

4. A rear suspension according to claim 3, wherein: said rear suspension further comprises a radius rod operatively connected at the rear end thereof to said knuckle arm and pivoted at the front end thereof to an end of said connecting arm.

5. A rear suspension according to claim 3, wherein: said connecting arm is rotatably supported by said vehicle body and said transversely inner end of said lower arm is interconnected with said vehicle body through said resilient member and said connecting arm, said transversely inner end of said lower arm being connected with an end of said connecting arm through said resilient member.

6. A rear suspension according to claim 4, wherein: said resilient member comprises a rubber bush.

7. A rear suspension according to claim 5, wherein: said resilient member comprises a rubber bush.

* * * * *